No. 746,804. PATENTED DEC. 15, 1903.
L. E. EVSLIN & G. OTT.
MEANS FOR FIXING ARTIFICIAL TEETH TO DENTAL PLATES.
APPLICATION FILED SEPT. 29, 1902.
NO MODEL.
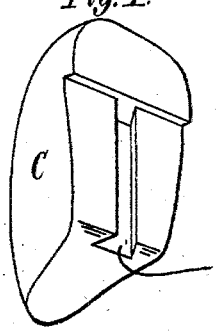
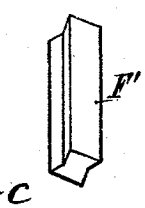
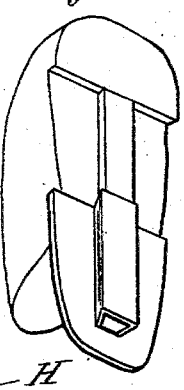
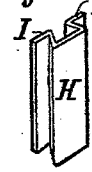
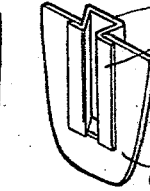
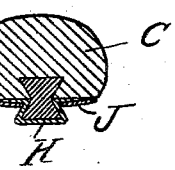
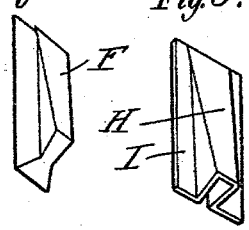
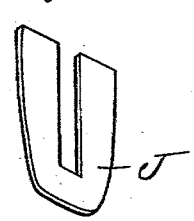
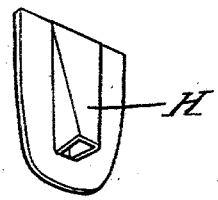
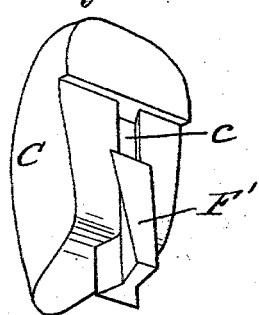
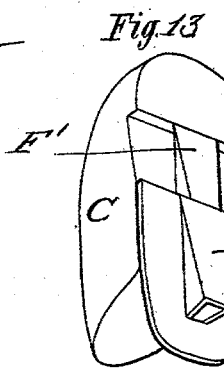

No. 746,804. Patented December 15, 1903.

UNITED STATES PATENT OFFICE.

LEO EDWARD EVSLIN AND GEORGES OTT, OF PARIS, FRANCE.

MEANS FOR FIXING ARTIFICIAL TEETH TO DENTAL PLATES.

SPECIFICATION forming part of Letters Patent No. 746,804, dated December 15, 1903.

Application filed September 29, 1902. Serial No. 125,269. (No model.)

*To all whom it may concern:*

Be it known that we, LEO EDWARD EVSLIN, a subject of the Emperor of Russia, residing at 7 Rue Chambizes, and GEORGES OTT, a citizen of Switzerland, residing at 12 Rue Cavalotti, Paris, France, have invented certain new and useful Improvements in Means for Fixing Artificial Teeth to Dental Plates, of which the following is a specification.

This invention relates to artificial teeth, and has for its object to provide novel means by which the teeth can be immediately fixed in position on the counter-plate of the dental plate, whereby the necessity of heating, soldering, or vulcanizing is obviated; and to these ends it consists in the features and in the means hereinafter described, reference being had to the accompanying drawings, forming a part of this specification, wherein—

Figure 1 represents a perspective view of the tooth before the fixtures have been applied thereto. Fig. 2 represents the metallic tongue adapted to be affixed thereto. Fig. 3 represents the box or casing which is adapted to be fixed to the tongue. Fig. 4 indicates the metallic washer. Fig. 5 illustrates the manner of connecting the boxing and the washer together. Fig. 6 is a detail perspective view illustrating the boxing partially slipped into place. Fig. 7 is a transverse sectional view. Fig. 8 is a detail perspective view of one form of the metallic tongue. Fig. 9 is a similar view of the box or casing. Fig. 10 is a similar view of the washer. Fig. 11 is a similar view of a combined washer and boxing. Fig. 12 is a detail view illustrating the manner of slipping the parts into operating position, and Fig. 13 is a similar view illustrating the manner of slipping the parts into position when they are constructed as shown in Fig. 11 of the drawings.

As shown in the drawings, the tooth comprises an artificial piece C, constructed in the usual manner, excepting that upon its rear surface it is provided with a dovetailed groove c, which extends from the bottom of the tooth to within proximity of its upper or cutting edge. Adapted to fit within this groove is a metallic tongue F', which consists of a metallic bar having substantially V-shaped grooves cut in its opposite edges in such manner that substantially one-half of such bar will project beyond the posterior portion of the tooth. Arranged to be slipped over the projecting portion of said tongue is a washer J, consisting of a substantially U-shaped leg, and arranged to be slipped over that portion of the tongue which projects through the washer is a box or casing H, which is bent in cross-section to correspond to the cross-sectional shape of that portion of the tongue which projects posteriorly of the tooth. In other words, it is bent in the form of a dovetail in cross-section and is provided with laterally-projecting wings or flanges I, which when the parts are secured in position will lie against the flat posterior portions of the tooth and will thereby afford a firm and secure bearing for the plate. The metallic tongue may be secured in its groove by any of the well-known cements used in the dental art, and the plate or casing may be secured to the dental plate in any of the well-known or usual manners.

Having described our invention, what we claim is—

1. In a tooth of the character herein described, the combination with the tooth provided upon its inner surface with a dovetail-shaped slot, of a correspondingly-shaped tongue fitted in said slot, said tongue projecting beyond the surface of the tooth and having longitudinal grooves formed in its edges which extend from the cervical border of the tooth to near the cutting edge thereof, and a box slidably arranged over said tongue and provided with laterally-projecting flanges which abut the tooth on both sides of said tongue, substantially as described.

2. An artificial tooth provided with a dovetail-shaped slot extending from the cervical border of the tooth into proximity of the cutting edge thereof, in combination with a metallic tongue fitted in said groove and projecting beyond thereof, a casing slidably arranged over said tongue and provided on its opposite edges with wings which rest upon the posterior surface of the tooth, and a slotted washer arranged between said wings and posterior surface of the tooth and secured to said parts, substantially as described.

In testimony whereof we have hereunto set our hands in presence of two subscribing witnesses.

LEO EDWARD EVSLIN.
GEORGES OTT.

Witnesses:
JEAN STUTZ,
EDWARD P. MACLEAN.